US009774660B2

(12) United States Patent
Ma et al.

(10) Patent No.: US 9,774,660 B2
(45) Date of Patent: Sep. 26, 2017

(54) METHOD AND SYSTEM FOR SEAMLESS WEBPAGE BROWSING (71) Applicant: TENCENT TECHNOLOGY (SHENZHEN) COMPANY LIMITED, Shenzhen (CN)

(72) Inventors: Xuemin Ma, Shenzhen (CN); Feng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 514 days.

(21) Appl. No.: 14/141,540

(22) Filed: Dec. 27, 2013

(65) Prior Publication Data
US 2014/0108520 A1 Apr. 17, 2014

Related U.S. Application Data (63) Continuation of application No. PCT/CN2013/073804, filed on Apr. 7, 2013.

(30) Foreign Application Priority Data

May 15, 2012 (CN) .......................... 2012 1 0149977

(51) Int. Cl.
G06F 15/16 (2006.01)
H04L 29/08 (2006.01)
G06F 17/30 (2006.01)

(52) U.S. Cl.
CPC ........ *H04L 67/10* (2013.01); *G06F 17/30873* (2013.01)

(58) Field of Classification Search
CPC ........... G06F 17/30899; G06F 2216/15; G06F 17/2235; H04L 67/10; H04W 8/24; H04N 21/6125
See application file for complete search history.

(56) References Cited

U.S. PATENT DOCUMENTS 9,094,360 B1 * 7/2015 Bapat ..................... H04L 63/102
2009/0037517 A1 * 2/2009 Frei ................... G06F 17/30893
709/202

(Continued)

FOREIGN PATENT DOCUMENTS

CN 1881883 A 12/2006
CN 1885326 A 12/2006

(Continued)

OTHER PUBLICATIONS

The World Intellectual Property Organization (WIPO) International Search Report for PCT/CN2013/073804 Jun. 27, 2013.

(Continued)

Primary Examiner — Hitesh Patel
(74) Attorney, Agent, or Firm — Anova Law Group, PLLC (57) ABSTRACT Various embodiments provide methods and systems for seamlessly browsing a webpage from a first browser client to a second browser client. When the first browser client receives a pre-set browser event, a webpage address of a webpage opened by the first browser client can be obtained. The webpage address can then be sent to a server and then obtained from the server when the second browser client is opened. The webpage corresponding to the webpage address can be obtained and outputted through the second browser client. When the second browser client is a mobile terminal browser, a persistent connection can be pre-established between the second browser client and the server, so that the webpage address can be quickly obtained from the server to improve the speed of seamlessly browsing the webpage.

12 Claims, 5 Drawing Sheets (56) References Cited

U.S. PATENT DOCUMENTS

| | | | |
|---|---|---|---|
| 2009/0158163 A1 | 6/2009 | Stephens et al. | |
| 2010/0269056 A1* | 10/2010 | Fujita | G06F 3/0486 |
| | | | 715/760 |
| 2012/0066577 A1* | 3/2012 | Saini | G06F 17/30905 |
| | | | 715/211 |
| 2013/0097239 A1* | 4/2013 | Brown | H04L 67/02 |
| | | | 709/204 |
| 2016/0112464 A1* | 4/2016 | Nyshadham | H04L 65/1083 |
| | | | 709/227 |

FOREIGN PATENT DOCUMENTS

| | | |
|---|---|---|
| CN | 101262388 A | 9/2008 |
| CN | 101719164 A | 6/2010 |
| CN | 101873460 A | 10/2010 |
| CN | 102111454 A | 6/2011 |

OTHER PUBLICATIONS

The State Intellectual Property Office of the People's Republic of China (SIPO) Office Action 1 for 201210149977.0 Aug. 17, 2015.
The State Intellectual Property Office of the People's Republic of China (SIPO) Office Action 2 for 201210149977.0 Jan. 26, 2016.

\* cited by examiner

METHOD AND SYSTEM FOR SEAMLESS WEBPAGE BROWSING

CROSS-REFERENCES TO RELATED APPLICATIONS

This application is a continuation application of PCT Patent Application No. PCT/CN2013/073804, filed on Apr. 7, 2013, which claims priority to Chinese Patent Application No. CN201210149977.0, filed on May 15, 2012, the entire contents of all of which are incorporated herein by reference.

FIELD OF THE DISCLOSURE

The present disclosure relates to the field of computer technology and, more particularly, relates to a method and system for seamless webpage browsing.

BACKGROUND

With wide use of portable devices nowadays, users can browse webpages through a variety of terminal devices, for example, smart phones, tablet computers, personal computers (PC), etc. When browsing webpages, the users may need to switch from one terminal device to another terminal device. It is, however, difficult for the browsers of the terminal devices to achieve seamless webpage browsing.

For example, the limited screen size of smart phones or other mobile terminals may restrict browsing of some webpages that are suitable for PCs. In some cases, when a user switches from a mobile terminal to a PC, the webpage browsing cannot be continued. The user may need to input the webpage address into the PC browser by memorizing the webpage address, or may need to send the webpage address to the PC using other suitable communication software. Seamless webpage browsing is thus complicated to achieve.

BRIEF SUMMARY OF THE DISCLOSURE

According to various embodiments, there is provided a method for seamless webpage browsing. A webpage address of a webpage opened by a first browser client can be obtained, when the first browser client receives a pre-set browser event. The webpage address can then be sent to a server and then obtained from the server when a second browser client is opened. The webpage corresponding to the webpage address can be obtained and outputted through the second browser client.

According to various embodiments, there is also provided a system for seamless webpage browsing. The system can include a first address obtaining unit, an address sending unit, a second address obtaining unit, and a webpage output unit. The first address obtaining unit can be configured to obtain a webpage address of a webpage opened by a first browser client when the first browser client receives a pre-set browser event. The address sending unit can be configured to send the webpage address to a server. The second address obtaining unit can be configured to obtain the webpage address from the server when a second browser client is opened. The webpage output unit can be configured to obtain the webpage corresponding to the webpage address and to output the webpage through the second browser client.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide methods and systems for seamlessly browsing a webpage, e.g., from a first browser client to a second browser client. When the first browser client receives a pre-set browser event, a webpage address of a webpage opened by the first browser client can be obtained. The webpage address can then be sent to a server and then obtained from the server when the second browser client is opened. The webpage corresponding to the webpage address can be obtained and outputted through the second browser client. When the second browser client is a mobile terminal browser, a persistent connection can be pre-established between the second browser client and the server, so that the webpage address can be quickly obtained from the server to improve the speed of seamlessly browsing the webpage.

Figure 1:
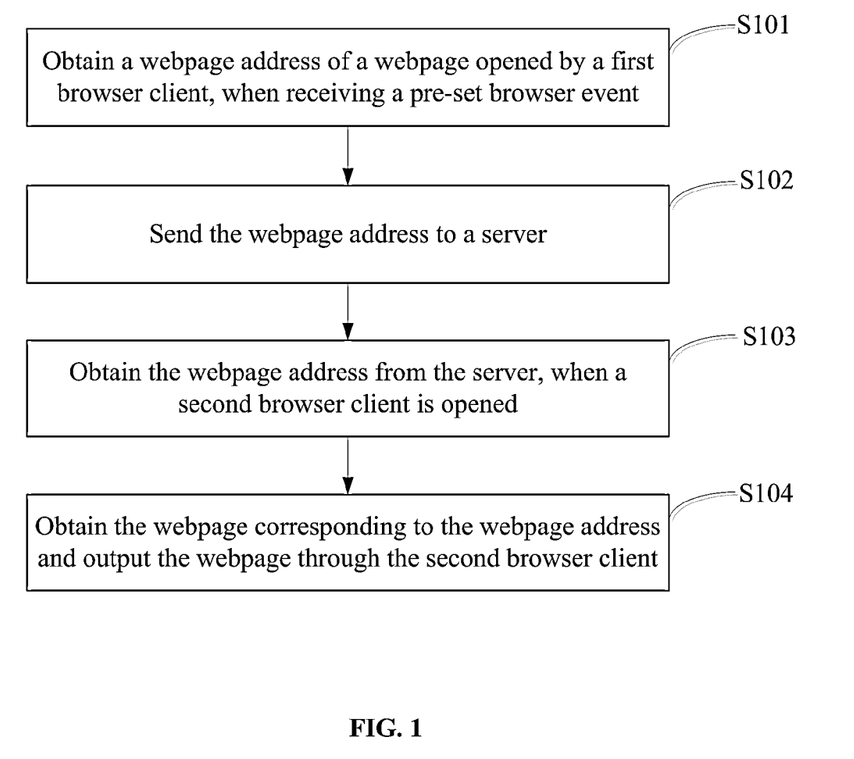
FIG. 1 depicts a schematic flow diagram for an exemplary method for seamless webpage browsing in accordance with various disclosed embodiments.

FIG. 1 depicts a schematic flow diagram for an exemplary method for seamless webpage browsing in accordance with various disclosed embodiments. The exemplary method can be implemented, for example, in an exemplary environment 600 as shown in FIG. 6.

Figure 6:
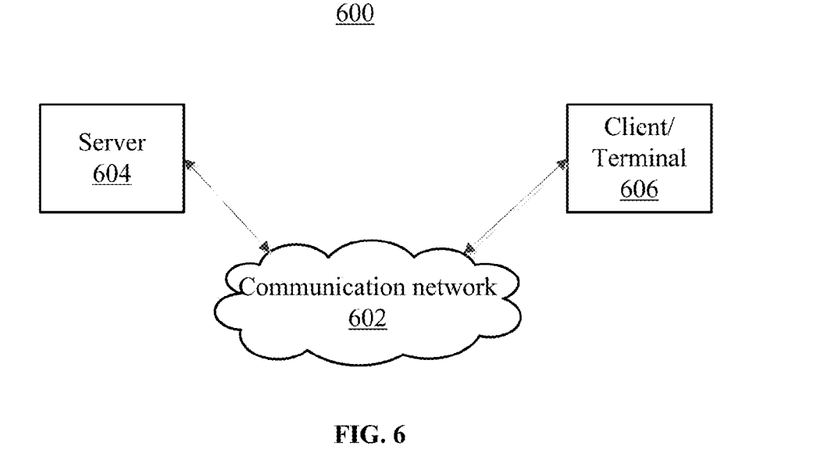
FIG. 6 depicts an exemplary environment incorporating certain disclosed embodiments.

FIG. 6 depicts an exemplary environment 600 incorporating certain disclosed embodiments. As shown in FIG. 6, environment 600 can include a server 604, a client (or a terminal) 606, and a communication network 602. The server 604 and the client 606 may be coupled through the communication network 602 for information exchange, such as webpage browsing, Internet searching, data downloading, etc. Although only one client 606 and one server 604 is shown in the environment 600, any number of clients 606 or servers 604 may be included, and other devices may also be included.

Communication network 602 may include any appropriate type of communication network for providing network connections to the server 604 and client 606 or among multiple servers 604 or clients 606. For example, communication network 602 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer one or more server computers configured to provide certain server functionalities, such as database management and search engines. A server may also include one or more processors to execute computer programs in parallel.

Figure 7:
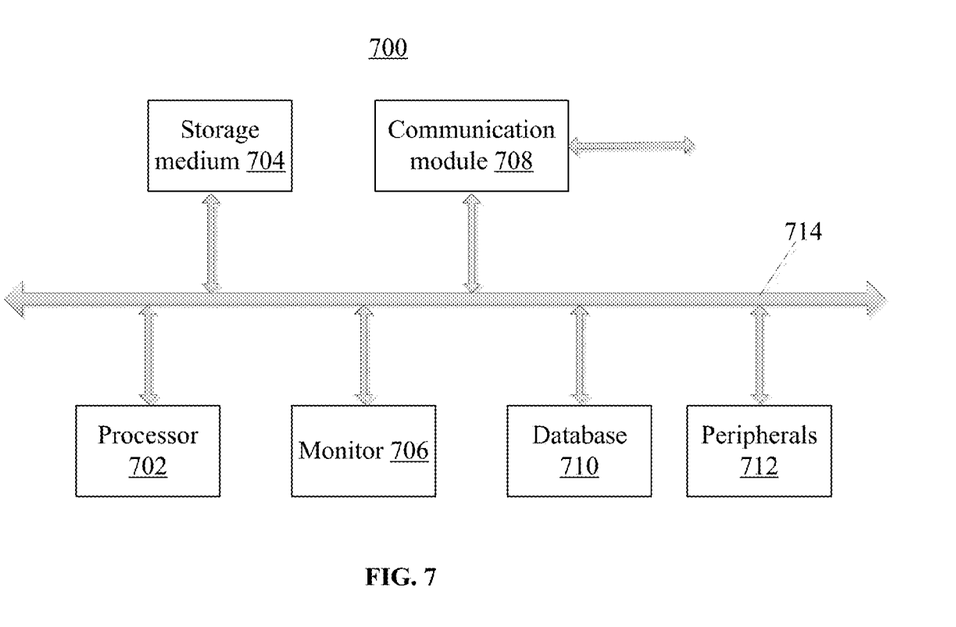
FIG. 7 depicts an exemplary server consistent with the disclosed embodiments.

The server 604 and the client/terminal 606 may be implemented on any appropriate computing platform. FIG. 7 shows a block diagram of an exemplary computer system 700 capable of implementing the server 604 and/or the client/terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

Processor 702 can include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, removable hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network 602. Database 710 may include one or more databases for storing certain data and for performing certain operations on the stored data, such as webpage browsing, database searching, etc.

In operation, client 606 may cause server 604 to perform certain actions, such as an Internet search or other database operations. Server 604 may be configured to provide structures and functions for such actions and operations. More particularly, server 604 may include a data searching system for real-time database searching.

The disclosed methods and systems for seamless webpage browsing (or for seamlessly browsing a webpage), e.g., as depicted in FIGS. 1-5, can be implemented, e.g., using the network environment 600 as depicted in FIG. 6.

Referring to FIG. 1, in Step S101, when a pre-set browser event is received, a webpage address of a webpage opened by a first browser client is obtained. In an embodiment, when a user is viewing a webpage through a first browser client on a terminal device, upon receiving the pre-set browser event, the webpage address of the webpage opened by the first browser client can be obtained. In various embodiments, the pre-set browser event can be an event including, for example, a browser closing event, a webpage address uploading event, and/or other suitable browser events that are pre-set. For example, a user may view a webpage through a first browser client on a PC. When the user closes the first browser client on the PC and switches to a different PC (or a mobile terminal), a browser closing event can be triggered. In another example, the user can trigger a webpage address uploading event by using a pre-set button of the first browser client.

In Step S102, the webpage address is sent to a server. For example, optionally, in order to improve the transmission efficiency of the webpage address from the first browser client, a selection prompt message can be outputted to the user before the webpage address is sent to the server. The selection prompt message can prompt the user to select the webpage address to be sent to the server. In some cases, when only one webpage is opened by the first browser client, the webpage address corresponding to that webpage can be sent directly to the server.

In Step S103, when a second browser client is opened for continuously browsing (e.g., to view or access) the webpage, the webpage address is obtained from the server. In Step S104, the webpage corresponding to the webpage address is obtained. The obtained webpage is outputted through the second browser client.

In one embodiment, when the second browser client is opened in order to continuously browse the webpage, the webpage address corresponding to the webpage can be obtained from the server. For example, the user may switch from one terminal device to another terminal device (for example, from a mobile terminal to a PC), and may need to continue to browse the webpage that is browsed on the previous terminal device. The user can obtain the webpage address from the server by opening the second browser client to obtain the webpage corresponding to the obtained webpage address. The webpage is then outputted through the second browser client for the user to continuously browse the webpage. Seamless browsing of the webpage can thus be achieved.

Figure 2:
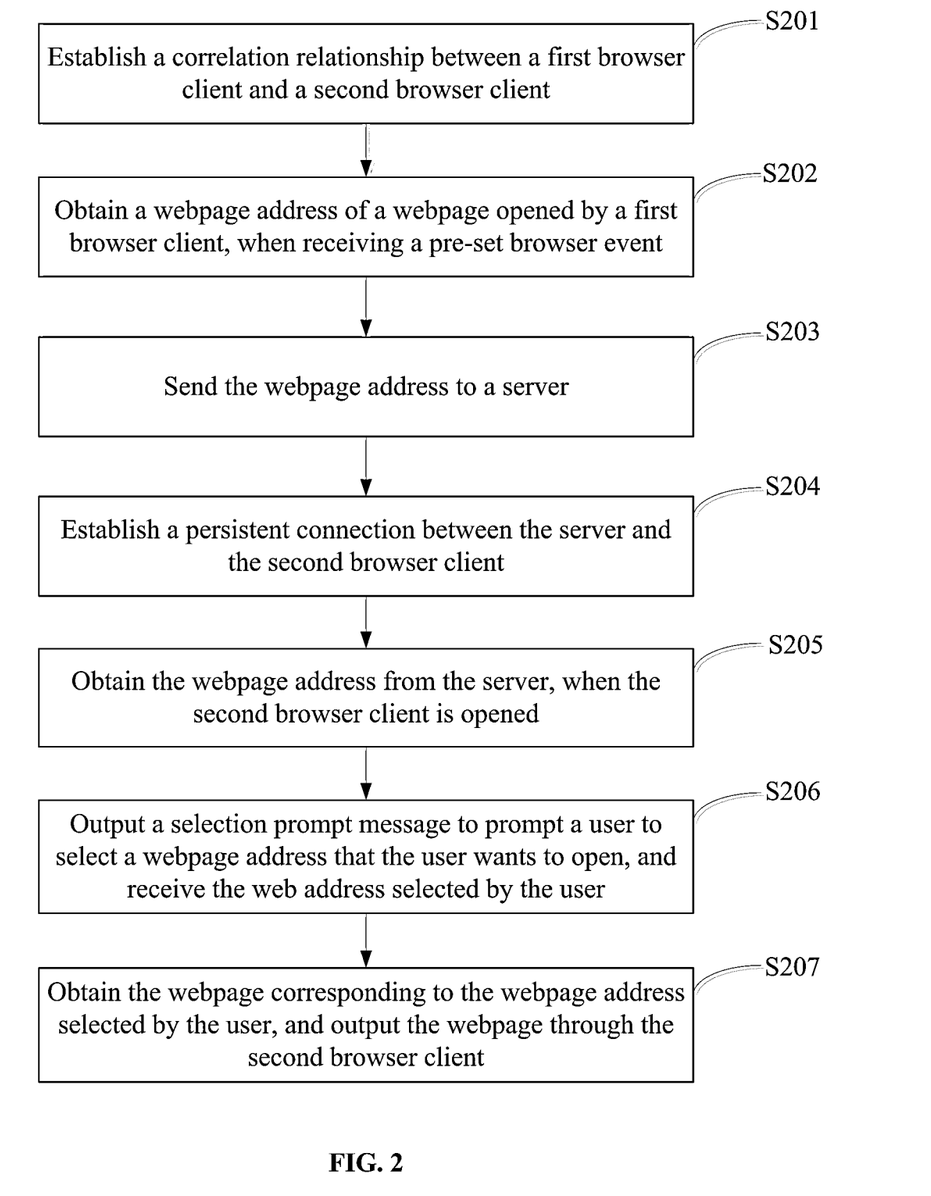
FIG. 2 depicts a schematic flow diagram for another exemplary method for seamless webpage browsing in accordance with various disclosed embodiments.

FIG. 2 depicts a schematic flow diagram for another exemplary method for seamless webpage browsing in accordance with various disclosed embodiments.

As shown in FIG. 2, in Step S201, a correlation relationship between a first browser client and a second browser client is established. In one embodiment, in order to identify a user of the first browser client and the second browser and to obtain desired webpage address that the user wants to continuously browse, a correlation relationship can be established between the first browser client and the second browser client. In some embodiments, the correlation relationship can be established using authentication information. For example, the first browser client and the second browser client can be correlated with same identity information and/or same user account information (e.g. username, password, etc.).

In Step S202, when a pre-set browser event is received, a webpage address of a webpage opened by the first browser client is obtained. In Step S203, the webpage address is sent to a server.

In one embodiment, after receiving the webpage address, the server can save the webpage address, and can establish a correlation relationship between the webpage address, the first browser client, and the second browser client. Specifically, an account can be established on the server for storing the user's authentication information. The received webpage address can be correlated with the authentication information.

In Step S204, a persistent (or keep-alive) connection is established between the server and the second browser client. For example, optionally, when the second browser client is a mobile terminal browser such as a smart phone, a persistent connection can be pre-established between the server and the second browser client such that the webpage address saved on the server can be quickly obtained from the server to improve the speed of opening the webpage corresponding to the webpage address.

In Step S205, when the second browser client is opened, the webpage address is obtained from the server. For example, when the second browser client is opened in order to continuously browse the webpage, the second browser client can obtain the webpage address from the server. Specifically, when the second browser client is opened, the second browser client can send to the server a webpage address download request and can receive the webpage address returned from the server. In one embodiment, when sending the download request for the webpage address, identity information (e.g., the identity information stored in a local cookie) can be sent to the server for the server to obtain the correlated webpage address.

In Step S206, a selection prompt message is outputted to prompt the user to select the webpage address that is desired to be opened or continuously browsed. The webpage address selected by the user is received by the second browser client. For example, in order to simplify the webpage output on the second browser client, a selection prompt message can be outputted to the user before the output of the webpage. The selection prompt message can prompt the user to select the desired webpage address. The webpage address selected by the user can then be received. As a result, the second browser client can become humanized.

In Step S207, the webpage corresponding to the webpage address selected by the user is obtained, and is outputted through the second browser client. For example, after receiving the webpage address selected by the user as depicted in Step S206, the webpage corresponding to the user selected webpage address can be obtained, and can be outputted through the second browser client.

In various embodiments, a correlation relationship between the first browser client and the second browser client can be pre-established. When the second browser client is a mobile terminal browser, a persistent connection can be pre-established between the second browser client and the server such that the webpage address saved on the server can be quickly obtained from the server to improve the speed for opening the webpage.

Figure 3:
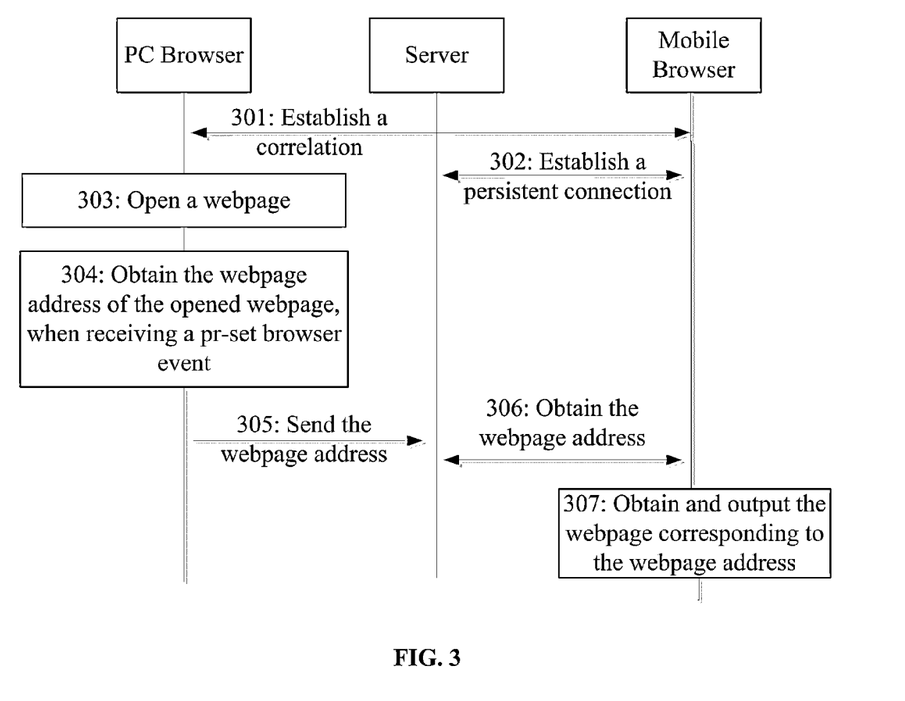
FIG. 3 depicts a schematic flow diagram for another exemplary method for seamless webpage browsing in accordance with various disclosed embodiments.

FIG. 3 depicts a schematic flow diagram for yet another exemplary method for seamless webpage browsing in accordance with various disclosed embodiments. In this example, a first browser client includes a PC browser and a second browser client includes a mobile browser such as a cell phone browser.

At 301, a correlation relationship between a first browser client (e.g. a PC browser) and a second browser client (e.g., a mobile browser) is established. For example, to identify a user of the PC browser and of the mobile browser, and to obtain a desired webpage address for the user to continuously browse, a correlation relationship is pre-established between the PC browser and the mobile browser. In some embodiments, the correlation relationship can be established by using authentication information. For example, the PC browser and the mobile browser can be correlated with same identity information, account information (e.g. username, password, etc.), and/or other information.

At 302, a persistent connection is established between a server and the mobile browser. For example, the persistent connection can be pre-established between the mobile browser and the server such that the webpage address saved on the server can be quickly obtained from the server to improve the speed of opening the webpage.

At 303, a webpage is opened by the PC browser. At 304, upon receiving a pre-set browser event, the PC browser obtains the webpage address of the opened webpage. Further, at 305, the PC browser sends the webpage address to the server.

In one embodiment, optionally, to improve the transmission efficiency of the webpage address from the PC browser, a selection prompt message can be outputted to the user before the webpage address is sent to the server. The selection prompt message can prompt the user to select the webpage address to be sent to the server. In some cases, when only one webpage is opened by the PC browser, the webpage address corresponding to this one webpage can be directly sent to the server.

At 306, when the mobile browser such as the cell phone browser is opened, the webpage address is obtained from the server. For example, when the mobile browser is opened, the mobile browser can obtain the webpage address from the server. Specifically, when the mobile browser is opened, the mobile browser can send, to the server, a webpage address download request and can receive the webpage address returned by the server. In one embodiment, when sending the download request for the webpage address, identity information (e.g., the identity information stored in a local cookie) can be sent to the server for the server to obtain the corresponding webpage address.

At Block 307, the mobile browser then obtains and outputs the webpage corresponding to the webpage address.

In this manner, an interacting process for seamlessly browsing a webpage between the PC browser and the mobile browser can be achieved by pre-establishing a correlation relationship between the PC browser and the mobile browser and establishing a persistent connection between the mobile browser and the server. The webpage address saved on the server can be quickly obtained from the server. The speed for seamlessly browsing the webpage between the PC and the mobile terminal can be improved.

In various embodiments, one or more or all of the steps in each of the exemplary methods as depicted herein (e.g., FIGS. 1-3) can be accomplished using a program/software to instruct related hardware. Such program/software can be stored in a computer readable storage medium including, e.g., ROM/RAM, magnetic disk, optical disk, etc.

Figure 4:
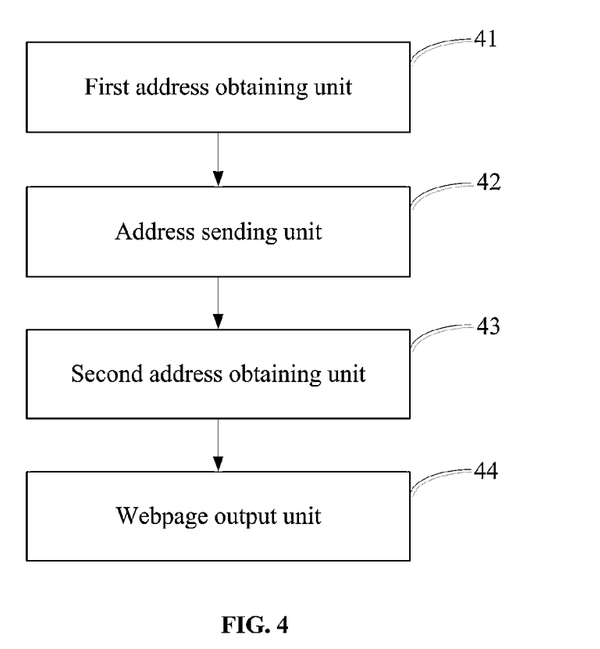
FIG. 4 depicts a schematic of an exemplary system for seamless webpage browsing in accordance with various disclosed embodiments.

FIG. 4 depicts a schematic of an exemplary system for seamless webpage browsing in accordance with various disclosed embodiments. For example, the system depicted in FIG. 4 can include a first address obtaining unit 41, an address sending unit 42, a second address obtaining unit 43, and/or a webpage output unit 44.

As shown in FIG. 4, when receiving a pre-set browser event, the first address obtaining unit 41 can obtain a webpage address of a webpage opened by a first browser client. The address sending unit 42 can send the webpage address to a server. When a second browser client is opened, the second address obtaining unit 43 can obtain the webpage address from the server. The webpage output unit 44 can obtain the webpage corresponding to the webpage address, and can output the webpage through the second browser client.

In some embodiments, each unit or component of the system for seamless webpage browsing can operate in a manner that is similar to or same as the corresponding step depicted in the exemplary seamless webpage browsing methods according to various disclosed embodiments, e.g., as depicted in FIGS. 1-3.

Figure 5:
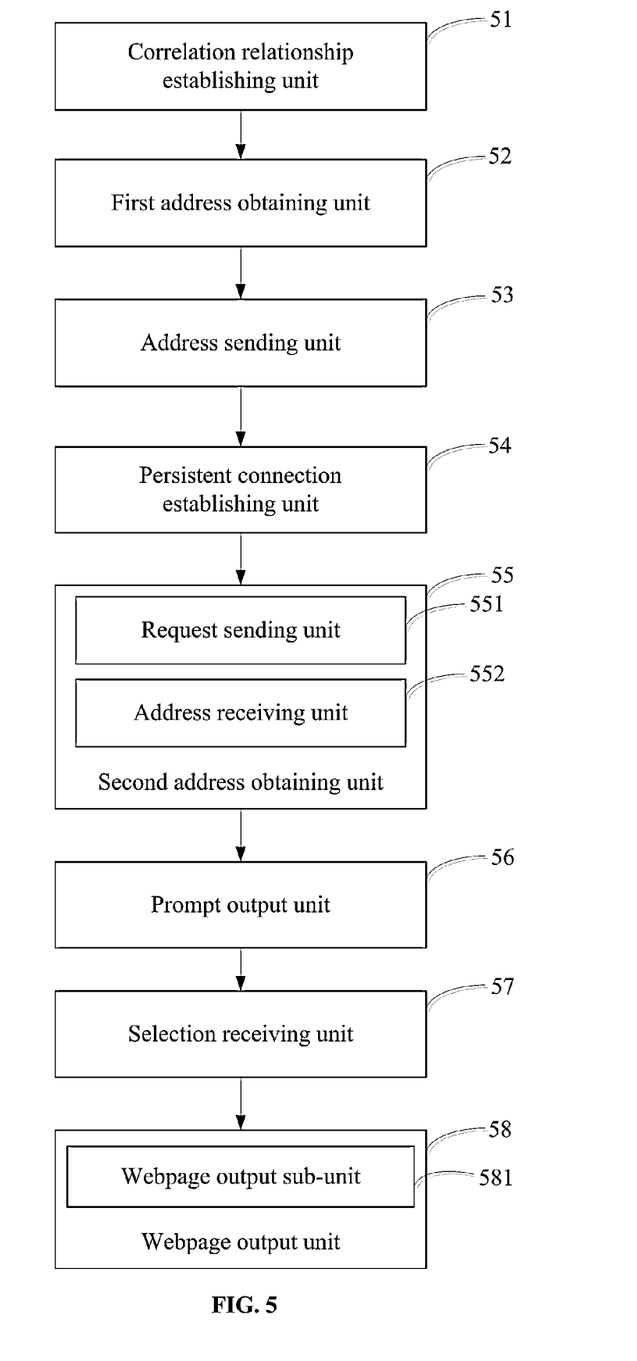
FIG. 5 depicts a schematic of another exemplary system for seamless webpage browsing in accordance with various disclosed embodiments.

FIG. 5 depicts a schematic of another exemplary system for seamless webpage browsing in accordance with various disclosed embodiments. For example, the system depicted in FIG. 5 can include a correlation relationship establishing unit 51, a first address obtaining unit 52, an address sending unit 53, a persistent connection establishing unit 54, a second address obtaining unit 55, a prompt output unit 56, a selection receiving unit 57, and/or a webpage output unit 58.

As shown in FIG. 5, the correlation relationship establishing unit 51 can establish a correlation relationship between a first browser client and a second browser client. In one embodiment, the second browser client can be a mobile terminal browser. When receiving a pre-set browser event, the first address obtaining unit 52 can obtain a webpage address of a webpage opened by the first browser client. The address sending unit 53 can send the webpage address to a server. The persistent connection establishing unit 54 can establish a persistent connection between the server and the second browser client. When the second browser client is opened, the second address obtaining unit 55 can obtain the webpage address from the server. The prompt output unit 56 can output a selection prompt message to prompt the user to select the webpage address that the user wants to open or to continuously browse. The selection receiving unit 57 can receive the webpage address selected by the user. The webpage output unit 58 can obtain the webpage corresponding to the webpage address, and can output the webpage by the second browser client.

In various embodiments, the second address obtaining unit 55 can include a request sending unit 551 and an address receiving unit 552. The request sending unit 551 can send a webpage address download request to the server; and the address receiving unit 552 can receive the webpage address sent by the server.

The webpage output unit 58 can include a webpage output sub-unit 581 configured to obtain the webpage corresponding to the webpage address selected by the user, and to output the webpage through the second browser client.

In one embodiment, each unit of the seamless webpage browsing system can be operated in a manner that is similar to or same as corresponding step(s) in the seamless webpage browsing methods according to various disclosed embodiments, e.g., as depicted in FIGS. 1-3.

According to various disclosed embodiments, when the pre-set browser event is received, the webpage address of the webpage opened by the first browser client can be obtained. The webpage address can be sent to the server. When the second browser client is opened, the second browser client can obtain the webpage address from the server, obtain the webpage corresponding to the webpage address, and output the webpage through the second browser client. Seamless webpage browsing can thus be achieved. As a result, when switching from one terminal device to another terminal device, the user can seamlessly browse a webpage. The process for seamlessly browsing a webpage can be simplified. The browser client can become smart and humanized. In some cases, when the second browser client is a mobile terminal browser, a persistent connection can be pre-established between the second browser client and the server, in order to quickly obtain the webpage address from the server. The speed of seamless webpage browsing can thus be improved.

In various embodiments, the disclosed units can be configured in one apparatus or configured in multiple apparatus as desired. The units disclosed herein can be integrated in one unit or in multiple units. Each of the units disclosed herein can be divided into one or more sub-units, which can be recombined in any manner.

The disclosed embodiments (e.g., as shown in FIGS. 1-7) can be examples only. One of ordinary skill in the art would appreciate that suitable software and/or hardware (e.g., a universal hardware platform) may be included and used to predict, manage, and execute the disclosed schemes. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

When browsing webpages, the users may want to continuously browse a same webpage when they need to switch from one terminal device to another terminal device. Various embodiments thus provide methods and systems for seamlessly browsing a webpage from a first browser client to a second browser client. For example, when the first browser client receives a pre-set browser event, a webpage address of a webpage opened by the first browser client can be obtained. The webpage address can then be sent to a server and then obtained from the server when the second browser client is opened. The webpage corresponding to the webpage address can be obtained and outputted through the second browser client.

An exemplary system for seamlessly browsing a webpage from a first browser client to a second browser client can include a first address obtaining unit, an address sending unit, a second address obtaining unit, and/or a webpage output unit. The first address obtaining unit can be configured to obtain a webpage address of a webpage opened by the first browser client when the first browser client receives a pre-set browser event. The address sending unit can be configured to send the webpage address to a server. The second address obtaining unit can be configured to obtain the webpage address from the server when the second browser client is opened. The webpage output unit can be configured to obtain the webpage corresponding to the webpage address and to output the webpage through the second browser client.

What is claimed is:
1. A method for seamless webpage browsing, comprising:
obtaining, by a first browser client, a webpage address of a webpage opened by the first browser client executed by a first processor of a first computing terminal, when the first browser client receives a pre-set browser event triggered by a user action on the first browser client;
in response to the triggered pre-set browser event, sending, by the first browser client, the obtained webpage address to a server, the server including at least a processor, wherein the server saves the webpage address;
obtaining, by a second browser client, the webpage address from the server, when the second browser client is opened on a second computing terminal, including:

sending, by the second browser client, a webpage address download request to the server;

receiving from the server, by the second browser client, the webpage address saved on the server;

obtaining, by the second browser client, the webpage corresponding to the webpage address; and outputting the webpage through the second browser client for a user to browse the webpage on the second computing terminal;

wherein the pre-set browser event is triggered by a browser closing event of the first browser client, wherein the method further comprises:

in response to the triggered pre-set browser event, receiving, by the server, a first account authentication information together with the webpage address from the first browser client;

establishing, by the server, a correlation relationship between the webpage address received from the first browser client and the first account authentication information;

receiving, by the server, a second account authentication information together with the webpage address download request from the second browser client terminal, the second account authentication information being the same as the first account authentication information; and sending, by the server, the webpage address correlated with the account authentication information to the second browser client terminal.

2. The method of claim 1, wherein, before the obtaining of the webpage address of the webpage opened by the first browser client, the method further comprises:

establishing a correlation relationship between the first browser client and the second browser client based on authentication information of the user, wherein the first browser client and the second browser client are correlated by same identity information or same account information.

3. The method of claim 1, further comprises:

before the second browser client obtains the webpage address from the server, establishing a persistent connection between the server and the second browser client, wherein the second browser client is a mobile terminal browser.

4. The method of claim 1, further comprising:

after the second browser client obtains the webpage address from the server, and before the outputting of the webpage through the second browser client, outputting, by the second browser client, a selection prompt message to prompt a user to select the webpage address that the user wants to open; and receiving the webpage address selected by the user;

wherein the outputting of the webpage through the second browser client further includes: outputting the webpage corresponding to the webpage address selected by the user.

5. The method of claim 4, wherein the obtaining and outputting of the webpage through the second browser client comprise:

obtaining the webpage corresponding to the webpage address selected by the user; and outputting the webpage through the second browser client.

6. A system for seamless webpage browsing, comprising:

a first computing terminal including at least a first processor;

a second computing terminal including at least a second processor; and a server;

wherein:

the first computing terminal is configured to:

obtain, by a first browser client, a webpage address of a webpage opened by the first browser client when a pre-set browser event is received, the pre-set browser event being triggered by a user action on the first browser client, the first browser client being executed by the first processor on the first computing terminal; and send, by the first browser client, the webpage address to the server, wherein the server saves the webpage address;

the second computing terminal is configured to:

obtain, by a second browser client, the webpage address from the server when the second browser client is opened, including: sending a webpage address download request to the server, the second browser client being executed by the second processor on the second computing terminal; and receiving from the server, the webpage address saved on the server;

obtain, by the second browser client, the webpage corresponding to the webpage address; and output the webpage through the second browser client for a user to browse the webpage on the second computing terminal;

wherein the pre-set browser event comprises a browser closing event of the first browser client, and the server is configured to:

in response to the triggered pre-set browser event, receive a first account authentication information together with the webpage address from the first browser client;

establish a correlation relationship between the webpage address received from the first browser client and the first account authentication information;

receive a second account authentication information together with the webpage address download request from the second browser client terminal, the second account authentication information being the same as the first account authentication information; and send the webpage address correlated with the account authentication information to the second browser client terminal.

7. The system of claim 6, wherein:

a correlation relationship is established between the first browser client and the second browser client based on authentication information of the user, the first browser client and the second browser client are correlated by same identity information or same account information, and the second browser client comprises a mobile terminal browser.

8. The system of claim 6, wherein the second computing terminal is further configured to:

establish a persistent connection between the server and the second browser client, wherein the second browser client is a mobile terminal browser.

9. The system of claim 6, wherein the second computing terminal is further configured to:

output a selection prompt message to prompt a user to select the webpage address that the user wants to open; and receive the webpage address selected by the user.

10. The system of claim 9, wherein the second computing terminal is further configured to:
   obtain the webpage corresponding to the webpage address selected by the user and to output the webpage through the second browser client.

11. The method of claim 1, further comprises: before sending the webpage address to the server,
   when multiple webpages are opened by the first browser client, outputting a selection prompt message to prompt a user to select the webpage address to be sent to the server; and
   when only one webpage is opened by the first browser client, directly sending the webpage address corresponding to the one webpage to the server.

12. The method of claim 1, wherein:
   the second browser client stores the account authentication information in a local cookie; and
   when the second browser client is opened, the second browser client sends the account authentication information and the webpage address download request to the server.

\* \* \* \* \*